United States Patent [19]
Sakai et al.

[11] Patent Number: 5,723,971
[45] Date of Patent: Mar. 3, 1998

[54] APPARATUS FOR CHARGING A BATTERY FOR A CHARGE TIME DETERMINED BASED ON THE DEPTH OF DISCHARGE

[75] Inventors: Shoji Sakai, Toyota; Toshiyuki Kawai, Toyohashi; Hironori Asa, Okazaki; Sadahisa Onimaru, Chiryu; Mitsuo Inagaki, Okazaki, all of Japan

[73] Assignee: Nippon Soken, Inc., Aichi, Japan

[21] Appl. No.: 684,077

[22] Filed: Jul. 19, 1996

[30] Foreign Application Priority Data

Jul. 20, 1995 [JP] Japan ..................... 7-184153

[51] Int. Cl.⁶ ................. H01M 10/46; H01M 10/48; H02J 7/04
[52] U.S. Cl. .................. 320/30; 320/32; 320/35; 320/39; 320/48
[58] Field of Search ................. 320/21, 22, 23, 320/30, 32, 35, 48; 324/427

[56] References Cited

U.S. PATENT DOCUMENTS 5,561,362  10/1996  Kawamura et al. ............ 320/48
5,583,871  12/1996  Simmonds et al. ............ 320/30
5,589,755  12/1996  Kaite et al. ................ 320/21

FOREIGN PATENT DOCUMENTS 6-267592  9/1994  Japan.
6-290816  10/1994  Japan.

*Primary Examiner*—Peter S. Wong
*Assistant Examiner*—Patrick B. Law
*Attorney, Agent, or Firm*—Cushman, Darby & Cushman IP Group of Pillsbury Madison & Sutro LLP

[57] ABSTRACT

A charging apparatus for a rechargeable storage battery is disclosed which charges the battery at a constant current. The charging apparatus monitors a variation in voltage of the battery during charge and finds a minimum value thereof to estimate the amount of capacity of the battery consumed before charge for determining the charge time required for charging the battery fully based on the estimate of the amount of capacity and the temperature of the battery.

12 Claims, 6 Drawing Sheets

DISCHARGE : 0.2CA, 1.0V/cell 30°C
CHARGE : 0.1CA 105%

DISCHARGE : 0.1CA, 1.0V/cell 30°C
CHARGE : 0.1CA-20, 30, 60°C

APPARATUS FOR CHARGING A BATTERY FOR A CHARGE TIME DETERMINED BASED ON THE DEPTH OF DISCHARGE

BACKGROUND OF THE INVENTION

1. Technical Field

The present invention relates generally to a charging apparatus for use with a rechargeable battery such as a nickel cadmium (Ni—Cd) storage battery or a nickel-hydrogen storage battery, and more particularly to a charging apparatus designed to charge a battery for a charge time determined based on the depth of discharge, i.e., the amount of capacity of the battery consumed before charge.

2. Background of Related Art

Nickel cadmium storage batteries are in widespread use as a secondary battery which may be recharged many times. A system monitoring a battery temperature at completion of a charging operation and a system monitoring a maximum value of a battery voltage are known in the art as techniques for determining a time when a charging operation of a battery is completed. These systems also measure the elapsed time from start of the charging operation using a charging timer and terminate the charging operation forcibly after a given period of time for avoiding the over-charge.

Japanese Patent First Publication No. 6-290816 teaches a charging system which monitors a battery temperature for determining completion of charge of a battery. FIG. 10 represents typical temperature characteristics of a nickel-hydrogen storage battery and shows that when a battery temperature is high, for example, above 40° C. a voltage drop from a peak voltage hardly occurs. It is thus impossible to detect the completion of charge by monitoring a maximum value of a battery voltage. The system taught in the above publication terminates the charging operation using a charge timer regardless of the voltage drop. However, the termination of the charging operation after a given period of time regardless of a completion time of charge of the battery dependent upon a charging condition of the battery or environmental conditions may lead to the lack of charge. To avoid this drawback, Japanese Patent First Publication No. 6-267592 teaches a charging system which estimates the remaining capacity in a storage battery based on a discharged current, a battery voltage, and a battery temperature immediately before a load is activated and determines a charge time based on the estimated remaining capacity.

The above prior art charging system however encounters the drawback in that if there is a time interval between the termination of an operation of the load and the start of the charging operation, the storage battery may experience the lack of charge since the amount of capacity lost by the self-discharge of the nickel storage battery is usually great. The determination of the amount of capacity lost by the self-discharge based on the time interval between the termination of the operation of the load and the start of the charging operation and environmental conditions of the battery requires complex mathematical operations, and it is difficult to find it with high accuracy. Additionally, there is a problem of over-charge since a battery temperature during the charging operation is not taken into account in determination of the amount of capacity lost by the self-discharge. This is due to the fact that an allowable charge capacity of the battery is undesirably decreased when a battery temperature during charge is greater than or equal to 20° C.

SUMMARY OF THE INVENTION

It is therefore a principal object of the present invention to avoid the disadvantages of the prior art.

It is another object of the present invention to provide a charging apparatus designed to charge a secondary battery such as a nickel-hydrogen storage battery safely and precisely.

According to one aspect of the present invention, there is provided a charging apparatus for a rechargeable storage battery which comprises a current regulating circuit for regulating a charging current supplied to the battery from a power circuit to a given constant level; a voltage detecting means for detecting a voltage of the battery; a temperature detecting means for detecting a temperature of the battery; and a charge time determining means for determining a charge time required for charging the battery fully at the charging current regulated in level by the current regulating circuit, the charge time determining means monitoring a variation in voltage detected by the voltage detecting means during charge and finding a minimum value of the variation in voltage to estimate the amount of capacity of the battery consumed before the charge for determining the charge time based on the amount of capacity estimated and the temperature of the battery detected by the temperature detecting means.

In the preferred mode of the invention, the charge time determining means corrects the charge time using an allowable charge capacity dependent upon the temperature of the battery detected by the temperature detecting means.

When the temperature of the battery detected by the temperature detecting means is smaller than a given value, the charge time determining means estimates a full charge capacity of the battery based on the minimum value of the variation in voltage and a time from start of charge until a maximum value of the variation in voltage detected by the voltage detecting means is reached to correct the charge time based on the estimated full charge capacity of the battery.

A display means is further provided for displaying information about a charged condition of the battery after the charge time expires.

The charge time determining means estimates the depth of discharge defined by a ratio of the amount of capacity of the battery consumed before the charge and a fully charged capacity of the battery based on the minimum value of the variation in voltage of the battery to determine the charge time.

The charge time is given by the following relation:

Charge time=depth of discharge/the charging current

A charge terminating means is further provided for terminating the charge of the battery after the charge time expires.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
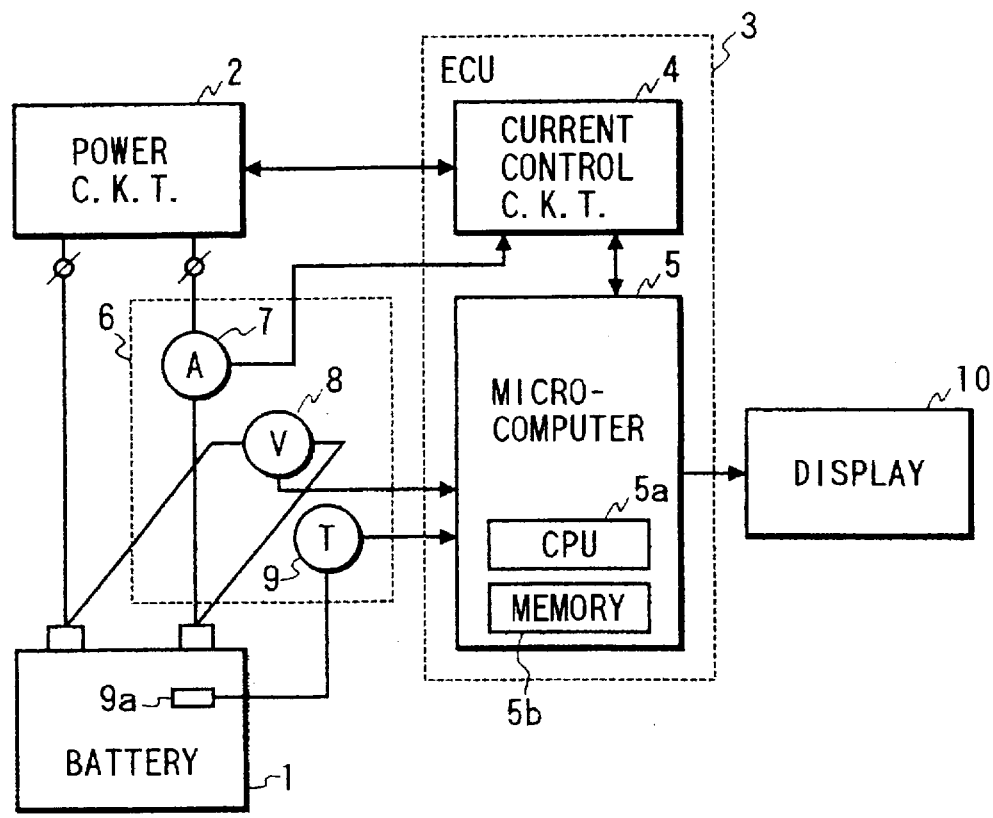
FIG. 1 is a block diagram which shows a charging apparatus according to the present invention.

Referring now to the drawings, particularly to FIG. 1, there is shown a charging apparatus according to the present invention which may be used for charging a rechargeable battery mounted in an electric vehicle.

The charging apparatus generally includes a power circuit 2, an electronic control unit (ECU) 3, and a display 10.

The power circuit 2 is connected to both terminals of a battery 1 to supply the current to the battery 1 during charge. The ECU 3 includes a current control circuit 4 and a microcomputer 5. The current control circuit 4 adjusts the current from the power circuit 2 to a given constant value. The microcomputer 5 includes a CPU 5a and a memory 5b.

The charging apparatus further includes a current detector 7, a voltage detector 8, and a temperature detector 9. The current detector 7 measures the current flowing from the power circuit 2 to the battery 1 and provides a signal indicative thereof to the current control circuit 4. The voltage detector 8 measures the voltage developed across the terminals of the battery 1 and provides a signal indicative thereof to the microcomputer 5. The temperature detector 9 includes a thermocouple 9a attached to a casing of the battery 1 to measure the temperature of the battery 1 and to provide a signal indicative thereof to the microcomputer 5. The constant current value set by the current control circuit 4 is also inputted to the microcomputer 5.

Figure 2:
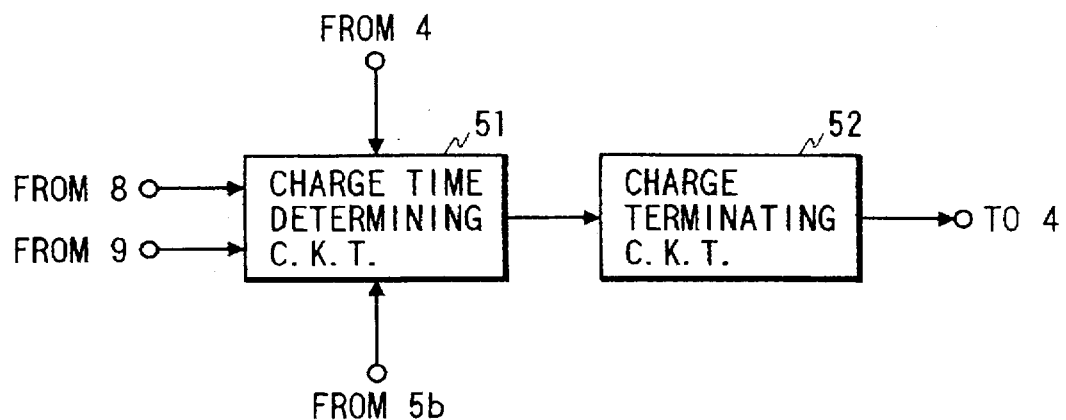
FIG. 2 is a block diagram which shows circuit arrangements of a CPU of an electronic control unit of the charging apparatus in FIG. 1.

The CPU 5a of the microcomputer 5 includes, as shown in FIG. 2, a charge time determining circuit 51 and a charge terminating circuit 52. The charge time determining circuit 51 determines a charge time for which the battery 1 is to be charged at the current value set by the current control circuit 4 based on parameters measured by the detectors 8 and 9. The charge terminating circuit 52 provides a control signal to the current control circuit 4 to terminate a charging operation thereof after the charge time determined by the charge time determining circuit 51 expires.

For the determination of the charge time, the charge time determining circuit 51 first calculates a rate of change in voltage of the battery 1 detected by the voltage detector 8, and estimates the depth of discharge of the battery 1 before charging according to a minimum value of the rate of change in voltage to determine a time required for the battery 1 to be fully charged at a constant current set by the current control circuit 4.

The memory 5b stores therein data for determining the charge time based on a charging current value supplied to the battery 1 and a minimum value of the rate of change in voltage and correction data for correcting the charge time according to a battery temperature and a full charge capacity of the battery 1. The memory 5b also stores results of operations performed by the CPU 5a temporarily.

The display 10 indicates information about the battery 1 during charging. For example, the display 10 indicates warning information when the battery temperature becomes undesirably high, the remainder of the charge time, and a full charge capacity of the battery 1.

Hereinbelow, the correction data stored in the memory 5b and the charge control by the CPU 5a will be discussed in detail.

Figure 3:
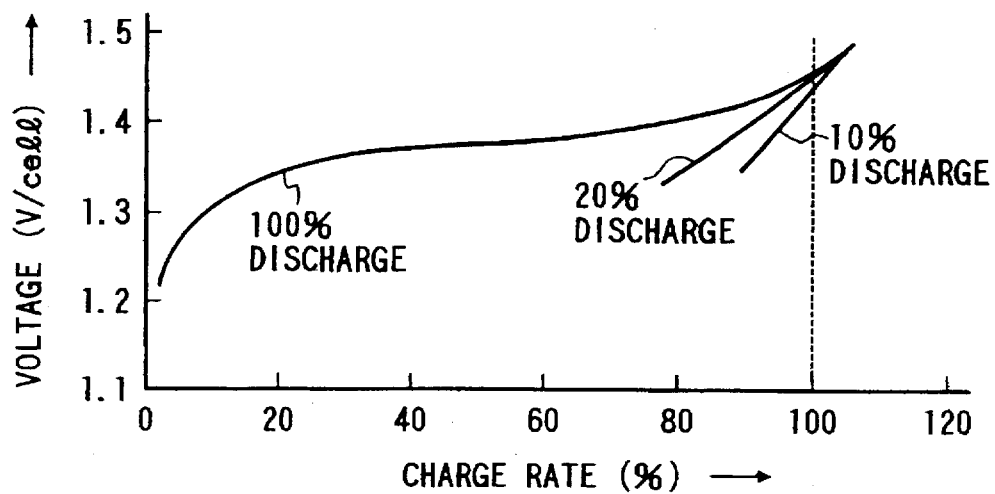
FIG. 3 is a graph which shows the relation between the voltage and the charge rate of a battery according to the depth of discharge of the battery.
Figure 4:
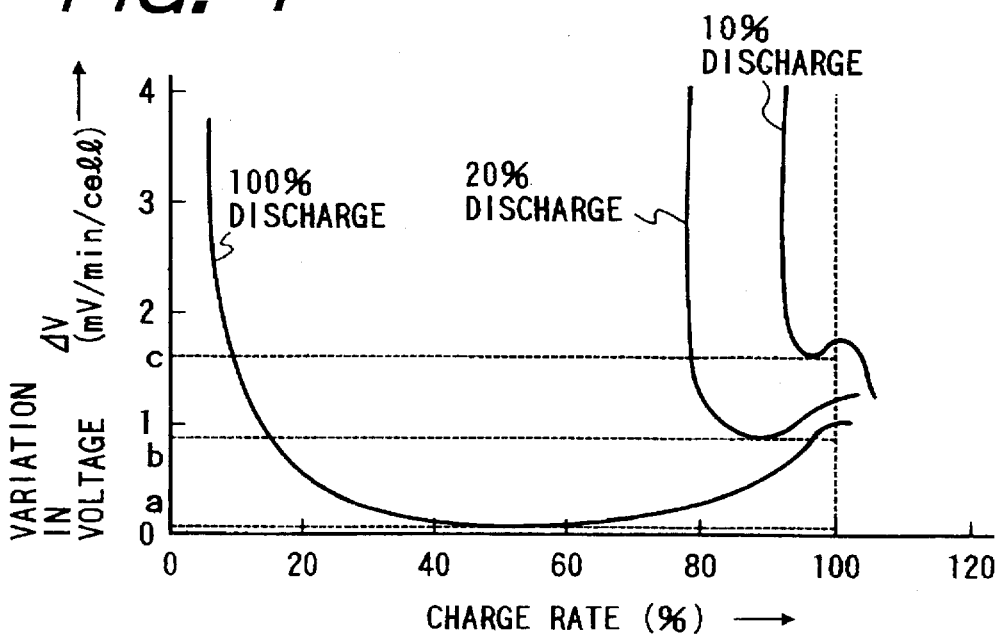
FIG. 4 is a graph which shows the relation between a variation in voltage and the charge rate of a battery according to the depth of discharge of the battery.

FIG. 3 shows an example of the relation between the charge rate and the voltage of the battery 1 when the battery 1 is discharged from a fully charged condition at a constant current of 0.1 CA to depths of discharge of 10%, 20%, and 100%, after which the battery 1 is charged at a constant current of 0.1 CA. FIG. 4 shows the relation between the charge rate and variations in voltage $\Delta V$ of the battery 1 at the depths of discharge of 10%, 20%, and 100% as shown in FIG. 3.

The depth of discharge represents the ratio of the amount of capacity consumed or discharged from the battery 1 to a full charge capacity of the battery 1. The charge rate is given by the following relation.

Charge rate(%)=[{full charge capacity (Ah)−discharged capacity (Ah)+charged capacity (Ah)}/full charge capacity (Ah)]×100 (1)

As can be seen from FIG. 4, minimum values $\Delta Vmin$ of the variations in voltage, as indicated at a, b, and c, are different according to the depth of discharge before the battery 1 is charged.

Figure 5:
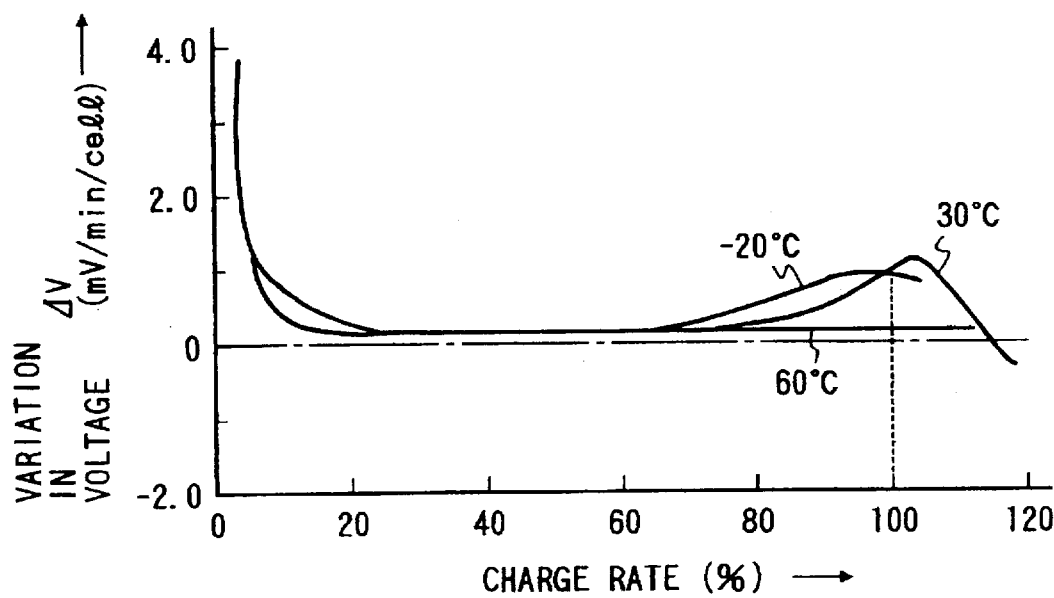
FIG. 5 is a graph which shows the relation between a variation in voltage and the charge rate of a battery according to the temperature of the battery.

FIG. 5 shows the relation between the charge rate and the variations in voltage $\Delta V$ when the battery 1 is fully discharged and then charged at a constant current of 0.1 CA at battery temperatures of −20° C., 30° C., and 60° C. As can be seen in the drawing, the relation between the charge rate and the variations in voltage hardly depends upon the battery temperature.

Figure 6:
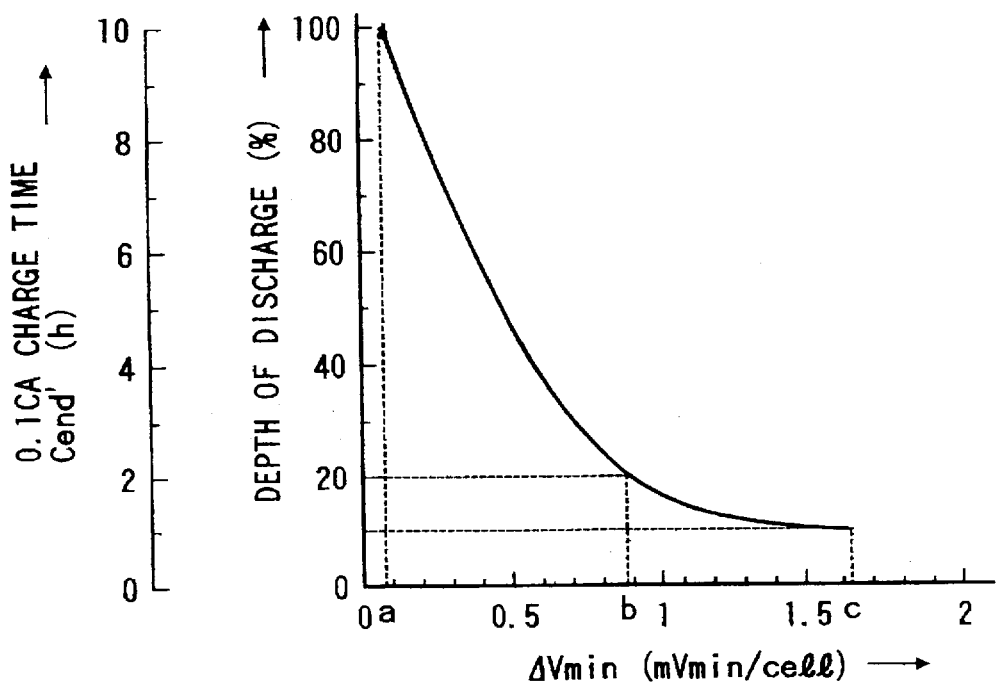
FIG. 6 is a graph which shows the relation between a charge time and a minimum value of a variation in voltage of a battery during charge and between the depth of discharge and the minimum value of the variation in voltage.

FIG. 6 shows an example of the relation between a minimum value $\Delta Vmin$ of the variation in voltage, as shown in FIG. 5, and the depth of discharge of the battery 1 before charge. The memory 5b stores therein this relation. The depth of discharge in FIG. 6 includes a loss of capacity caused by the self-discharge of the battery 1 after an operation of a load connected to the battery 1 is terminated. The charge time Cend' required for charging the battery 1 fully from the start of the charging operation is represented by the following relation.

Cend' (h)={depth of discharge(%)/100}/charging current value (CA)  (2)

Figure 9:
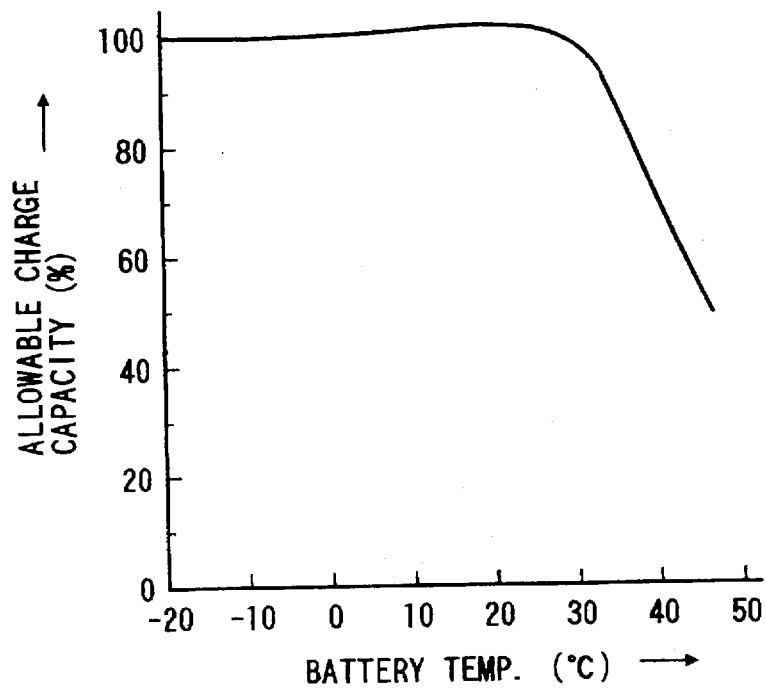
FIG. 9 is a graph which shows the relation between an allowable charge capacity and a battery temperature.
Figure 10:
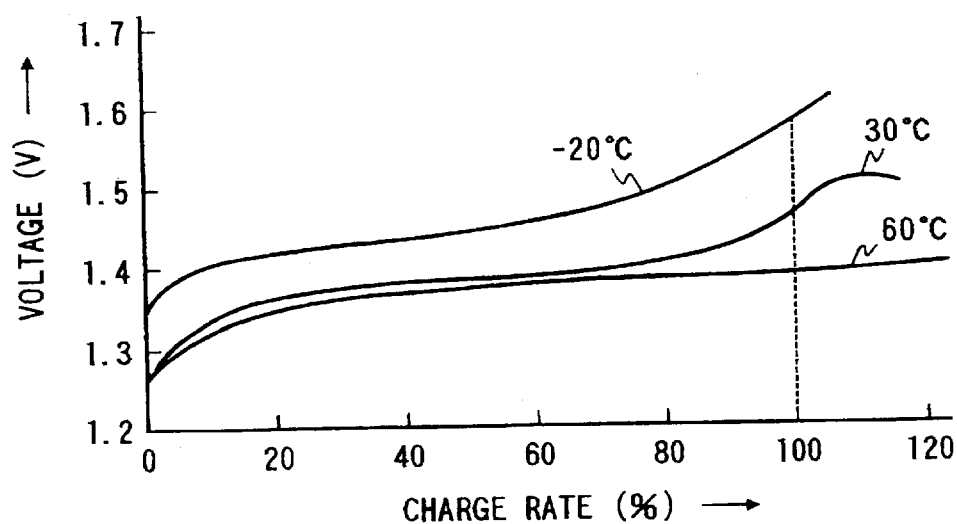
FIG. 10 is a graph which shows the relation between the voltage and the charge rate of a battery according to a battery temperature.

The memory 5b also stores therein the relation between an allowable charge capacity and a battery temperature, as shown in FIG. 9, as correction data for the charge time Cend' and a current full charge capacity of the battery 1 (Usually, the full charge capacity of a battery deteriorates to the capacity of actual use, and an initial value thereof is a rated capacity). The full charge capacity is, as will be described in detail, determined based on a charge time required for the battery 1 to be charged below 20° C. to reach a maximum value of a variation in voltage. If the battery 1 consists of a single battery pack made up of a collection of same type batteries, the memory 5b may store a full charge capacity of each of batteries.

Figure 7:
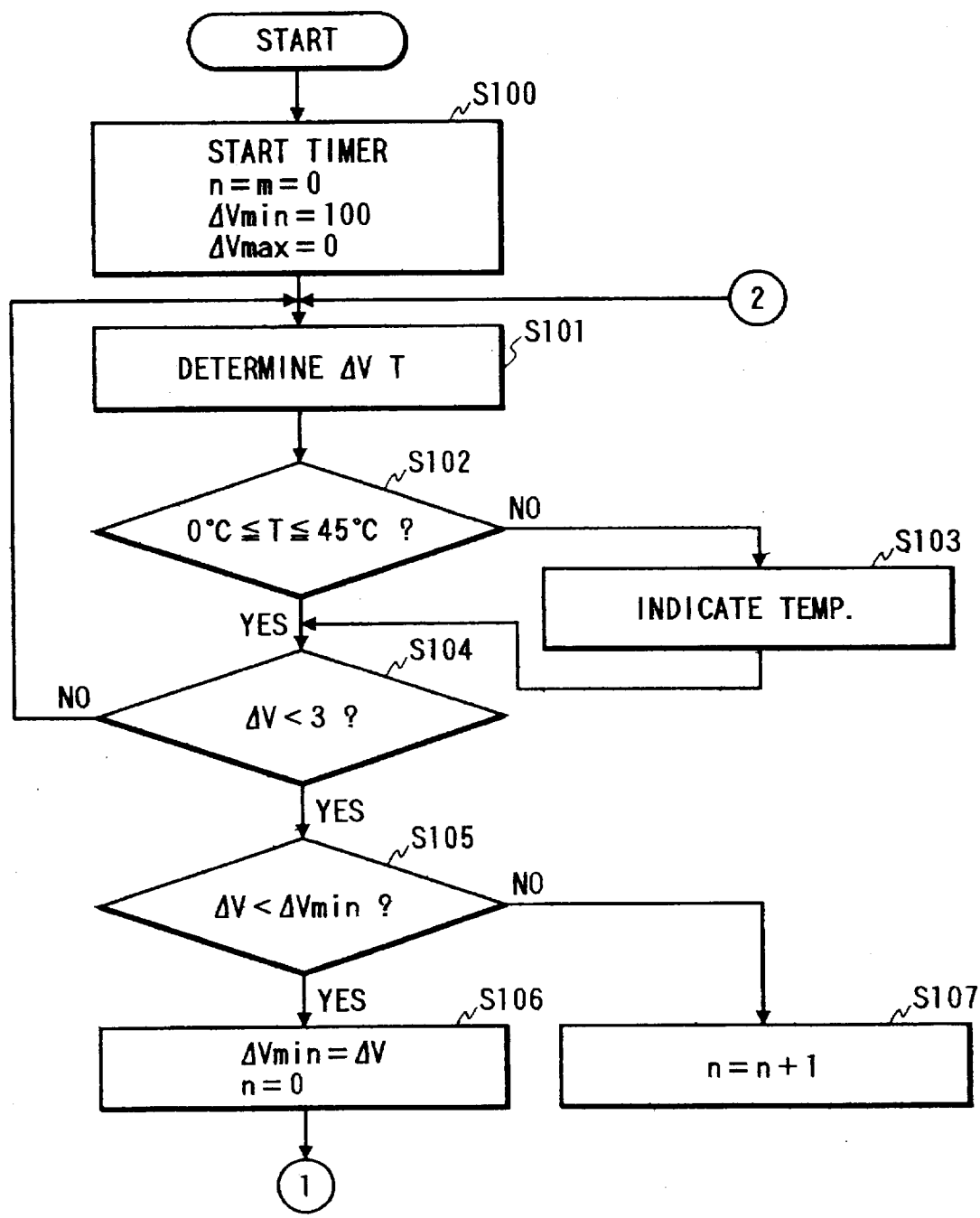
FIGS. 7 and 8 show a flowchart of a charge control program performed by a charging apparatus of the invention.
Figure 8:
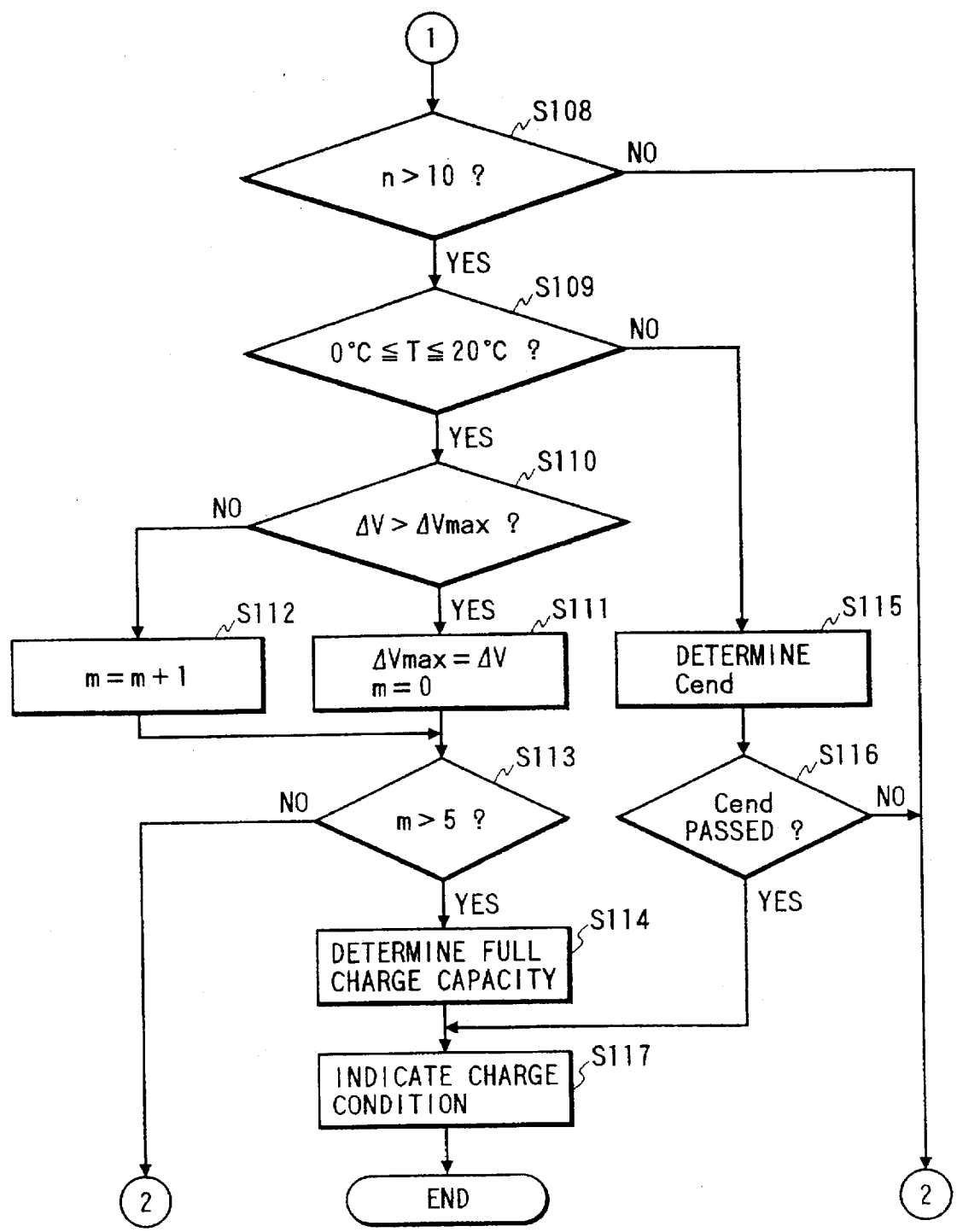

FIGS. 7 and 8 show a flowchart of a charge control program executed by the CPU 5a. This program is initiated upon connection of the battery 1 to the charging apparatus and turning on of the power circuit 2 to start the charging operation and repeated every program cycle of 1 min.

After entering the program, the routine proceeds to step 100 wherein an initializing operation is performed. Specifically, count values n and m are cleared, the minimum value ΔVmin of a variation in voltage of the battery 1 and the maximum value ΔVmax thereof are reset to "100" and "0", respectively, and a timer built in the CPU 5a is started.

The routine then proceeds to step 101 wherein a voltage variation ΔV (mV/min/cell) of the battery 1 is determined in the following manner. The battery temperature T is monitored every 0.1 sec. through the temperature detector 9 to determine an average temperature value thereof for 1 min. Similarly, the voltage V of the battery 1 is monitored every 0.1 sec. through the voltage detector 8 to determine an average voltage value thereof for 1 min. Next, a difference between the average voltage value derived in this program cycle and that derived in a previous program cycle is determined to find the voltage variation ΔV of the battery 1.

The routine then proceeds to step 102 wherein it is determined whether the battery temperature T (i.e., the average temperature value derived in step 101) lies within a range from 0° C. to 45° C. or not. If a NO answer is obtained, then the routine proceeds to step 103. Alternatively, if a YES answer is obtained, then the routine proceeds to step 104.

In step 103, a warning signal is provided to the display 10 to inform that the battery temperature T is not within an effective range because it is difficult to charge the battery 1 completely when the battery temperature T is out of the temperature range in step 102. In step 103, the charging operation may be stopped until the battery temperature T is decreased to fall within the effective range. For example, when the battery temperature T is increased above 45° C., the charging operation is stopped. Afterward, when it reaches 30° C., the charging operation is resumed.

In step 104, it is determined whether the voltage variation ΔV is smaller than three (3) or not. If a NO answer is obtained, then the routine returns back to step 101. Alternatively, if a YES answer is obtained, then the routine proceeds to step 105 wherein it is determined whether the voltage variation ΔV is smaller than the minimum value ΔVmin of variations in voltage or not. If a YES answer is obtained (ΔV <ΔVmin), then the routine proceeds to step 106 wherein the minimum value ΔVmin is set to the voltage variation ΔV, and the count value n is reset to zero (0). Alternatively, if a NO answer is obtained, then the routine proceeds to step 107 wherein the count value n is incremented by one.

After step 106 or 107, the routine proceeds to step 108 wherein it is determined whether the count value n is greater than ten (10) or not. The provision of step 108 eliminates the need for steps after step 109 to be performed repeatedly each time the minimum value ΔVmin is set to the voltage variation ΔV in step 106.

If a NO answer is obtained in step 108, then the routine returns back to step 101. Alternatively, if a YES answer is obtained, then the routine proceeds to step 109 wherein it is determined whether the battery temperature T is within a range from 0° C. to 20° C. or not. If a YES answer is obtained, the routine proceeds to step 110 wherein it is determined whether the voltage variation ΔV is greater than the maximum value ΔVmax or not since the maximum value ΔVmax of variations in voltage of the battery 1 can be detected when the battery temperature T is within a range from 0° C. to 20° C. If a YES answer is obtained, then the routine proceeds to step 111. Alternatively, if a NO answer is obtained, then the routine proceeds to step 112.

In step 111, the maximum value ΔVmax is set to the voltage variation ΔV, and the count value m is reset to zero (0). In step 112, the count value m is incremented by one.

After step 111 or 112, the routine proceeds to step 113 wherein it is determined whether the count value m is greater than five (5) or not. If a NO answer is obtained, then the routine returns back to step 101. Alternatively, if a YES answer is obtained, then the routine proceeds to step 114 wherein a full charge capacity of the battery 1 is determined according to the following equation.

Full charge capacity (Ah)={charge time (h) until the maximum value ΔVmax is reached×charging current (CA)×rated capacity (Ah)}/{100−depth of discharge(%)}×100   (3)

Note that the depth of discharge of the battery 1 is determined, for example, using the map shown in FIG. 6 based on the minimum value ΔVmin.

If a NO answer is obtained in step 109 meaning that the battery temperature T is out of the range from 0° C. to 20° C., then the routine proceeds to step 115 wherein the depth of discharge of the battery 1 before charge is estimated using the map shown in FIG. 6 to determine the charge time Cend according to the following equation which corresponds to the equation (2) corrected using the relation between an allowable charge capacity and a battery temperature, as shown in FIG. 9, and the full charge capacity.

Cend (h)=Cend'(h)×{allowable charge capacity(%)/100}×{full charge capacity (Ah)/rated capacity (Ah)}   (4)

This eliminates the need for the mount of capacity lost by the self-discharge of the battery 1 for the interval from the termination of operation of the load to the start of the charging operation to be determined, thereby allowing the charge time to be determined with high accuracy.

After step 115, the routine proceeds to step 116 wherein it is determined whether the charge time has expired or not after the start of the charging operation. If a NO answer is obtained, then the routine returns back to step 101. Alternatively, if a YES answer is obtained, then the routine proceeds to step 117 wherein the amount of capacity stored in the battery 1 or a charge rate (whose maximum value is 100%) is determined according to the following equation.

Charge rate(%)={{100−depth of discharge(%)+charge time (h)× charging current (CA)×rated capacity (Ah)}/full charge capacity (Ah)}×100   (5)

Next, the CPU 5a indicates the charge rate and the fully charged capacity of the battery 1 through the display 10, and the routine then terminates. Alternatively, the routine may terminate after the battery 1 is further charged at a given lower current for a preselected period of time.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, a charging current provided by the power circuit 2 to the battery 1 is not limited to the constant current of 0.1 A. The present invention may applied to all manner of secondary batteries which assume the above characteristics of the voltage variation during charge at a constant current.

What is claimed is:

1. A charging apparatus for a rechargeable storage battery comprising:

a current regulating circuit for regulating, to a given constant level, a charging current supplied to the battery from a power circuit;

voltage detecting means for detecting a voltage of the battery;

temperature detecting means for detecting a temperature of the battery; and charge time determining means for determining a charge time required for charging the battery fully at the charging current regulated in level by said current regulating circuit, said charge time determining means monitoring a variation in the voltage detected by said voltage detecting means during a charge and finding a minimum value of the variation in the voltage to estimate an amount of capacity of the battery consumed before the charge for determining the charge time based on the amount of capacity estimated and the temperature of the battery detected by said temperature detecting means.

2. A charging apparatus as set forth in claim 1, wherein said charge time determining means corrects the charge time using an allowable charge capacity dependent upon the temperature of the battery detected by said temperature detecting means.

3. A charging apparatus as set forth in claim 1, wherein when the temperature of the battery detected by said temperature detecting means is smaller than a given value, said charge time determining means estimates a full charge capacity of the battery based on the minimum value of the variation in voltage and a time from a start of the charge until a maximum value of the variation in the voltage detected by said voltage detecting means is reached to correct the charge time based on the estimated full charge capacity of the battery.

4. A charging apparatus as set forth in claim 1, further comprising display means for displaying information about a charged condition of the battery after the charge time expires.

5. A charging apparatus as set forth in claim 1, wherein said charge determining means estimates a depth of discharge defined by a ratio of the amount of capacity of the battery consumed before the charge and a fully charged capacity of the battery based on the minimum value of the variation in the voltage of the battery to determine the charge time.

6. A charging apparatus as set forth in claim 5, wherein the charge time is given by a following relation:

The charge time=the depth of discharge/the charging current.

7. A charging apparatus as set forth in claim 1, further comprising charge terminating means for terminating the charge of the battery after the charge time expires.

8. A charging apparatus as set forth in claim 7, wherein said charge terminating means comprises a microcomputer.

9. A charging apparatus as set forth in claim 1, wherein said charge time determining means comprises a microcomputer.

10. A charging apparatus as set forth in claim 9, wherein the voltage detecting means includes means for providing a signal to the microcomputer indicating the voltage of the battery.

11. A charging apparatus as set forth in claim 9, wherein said temperature detecting means comprises a thermocouple operatively coupled to a casing of the battery, said thermocouple providing a signal to the microcomputer indicating the temperature of the battery.

12. A charging apparatus as set forth in claim 1, wherein when the temperature of the battery detected by said temperature detecting means is larger than a given value, said charge time determining means estimates a full charged capacity of the battery based on the minimum value of the variation in voltage and a time from a start of the charge until a maximum value of the variation in the voltage detected by said voltage detecting means is reached to correct the charge time based on the estimated full charge capacity of the battery.

* * * * *